United States Patent [19]

Brambilla

[11] Patent Number: 5,088,914
[45] Date of Patent: Feb. 18, 1992

[54] DOUBLE FLIGHTED EXTRUSION SCREW

[76] Inventor: Romano Brambilla, Via Rua Muro 86, 41100 Modena, Italy

[21] Appl. No.: 522,140

[22] Filed: May 11, 1990

[51] Int. Cl.$^5$ .............................................. B29B 7/42
[52] U.S. Cl. ................... 425/208; 264/211.23; 366/81; 366/88; 366/89; 425/209
[58] Field of Search ............ 425/208, 209, 812, 376.1; 264/102, 211.23; 366/80, 81, 82, 88, 89

[56] References Cited

U.S. PATENT DOCUMENTS

| | | | |
|---|---|---|---|
| 2,518,124 | 8/1950 | Corbett | 425/208 |
| 2,798,444 | 7/1957 | Meakin | 425/204 |
| 2,896,253 | 7/1959 | Mol | 198/525 |
| 3,239,883 | 3/1966 | Ferrari | 198/661 |
| 3,271,819 | 9/1966 | Lacher | 366/89 |
| 3,464,539 | 9/1969 | Kelly | 198/661 |
| 3,487,503 | 1/1970 | Barr et al | 425/208 |
| 3,504,400 | 4/1970 | Natov | 425/376.1 |
| 3,570,654 | 3/1971 | Hill | 366/322 |
| 3,593,843 | 7/1971 | Hill | 425/376.1 |
| 3,605,995 | 9/1971 | Maack | 198/660 |
| 3,652,064 | 3/1972 | Lehen | 425/208 |
| 3,676,034 | 7/1972 | Wendricks | 425/208 |
| 4,128,341 | 12/1978 | Hsu | 425/208 |
| 4,227,870 | 10/1980 | Kim | 425/209 |
| 4,280,802 | 7/1981 | Lang et al. | 425/208 |
| 4,405,239 | 9/1983 | Chung et al. | 425/208 |
| 4,447,156 | 5/1984 | Csonger | 425/208 |
| 4,900,494 | 2/1990 | Wobbe | 264/211.23 |
| 4,908,169 | 3/1990 | Galiz et al. | 425/208 |
| 4,944,906 | 7/1990 | Colby et al. | 425/208 |

FOREIGN PATENT DOCUMENTS

| | | | |
|---|---|---|---|
| 964617 | 5/1952 | France | 366/89 |
| 1165985 | 10/1969 | United Kingdom . | |
| 1206635 | 9/1970 | United Kingdom . | |
| 145087 | 9/1976 | United Kingdom . | |

OTHER PUBLICATIONS

Spirex Publication, "Screw and Barrel Technology" (no date available).

Primary Examiner—Jay H. Woo
Assistant Examiner—Robert B. Davis
Attorney, Agent, or Firm—Connolly & Hurtz

[57] ABSTRACT

An extrusion machine includes a barrel or cylinder which houses an extrusion screw. The screw includes a feed section into which powder material is fed. The material is then fed into a mixing section, then through a transition section and then to another mixing section and finally to a section for mixing and metering the material as it is fed to the die. The extrusion screw in each of the mixing sections includes a double flight for causing the material to move back and forth in each section as it is fed to the discharge end of the barrel. The mix and meter section also includes keys to further mix the material.

22 Claims, 3 Drawing Sheets

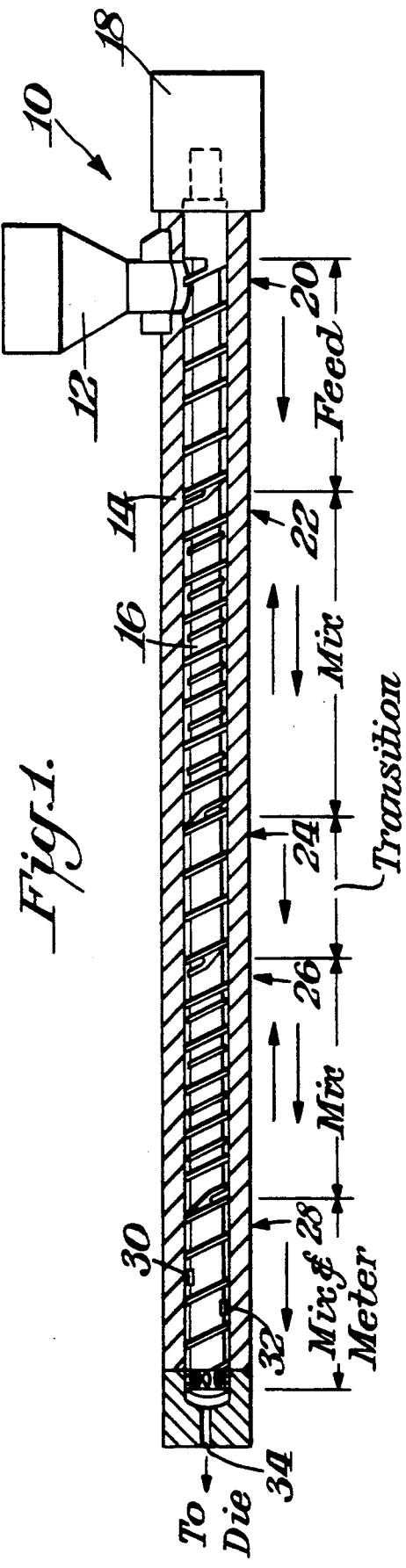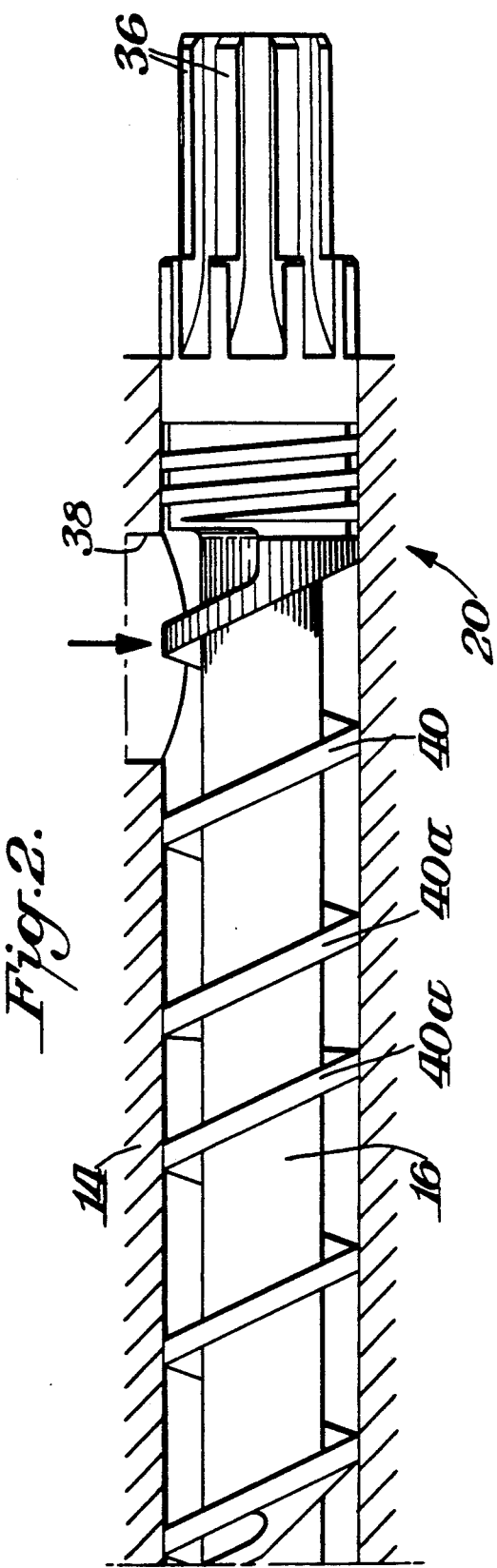

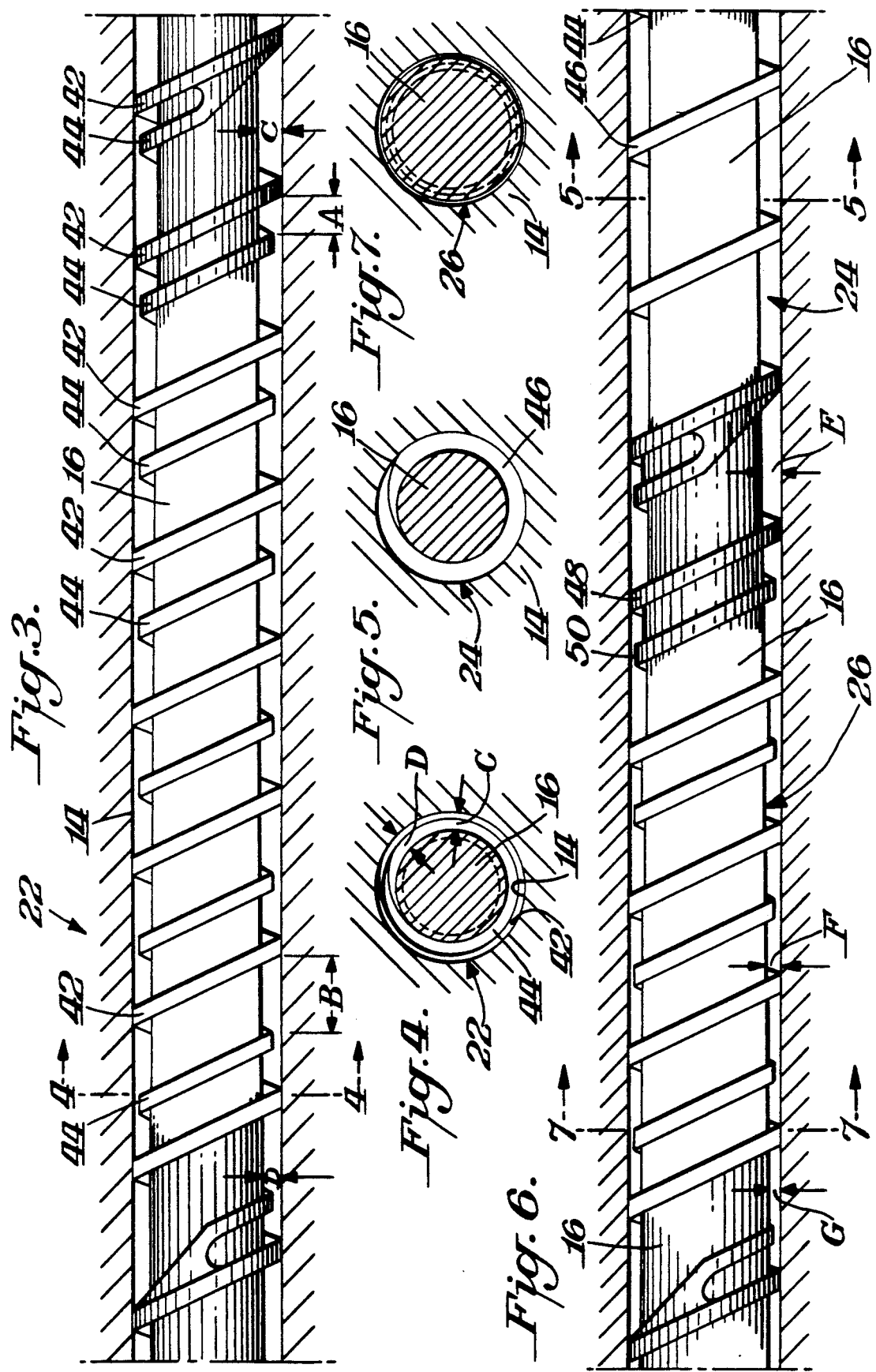

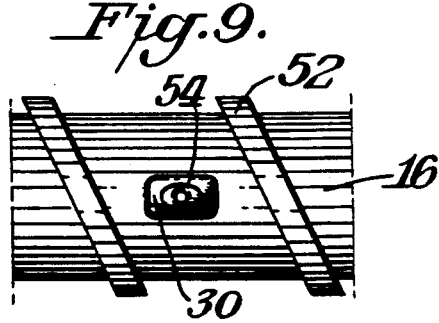
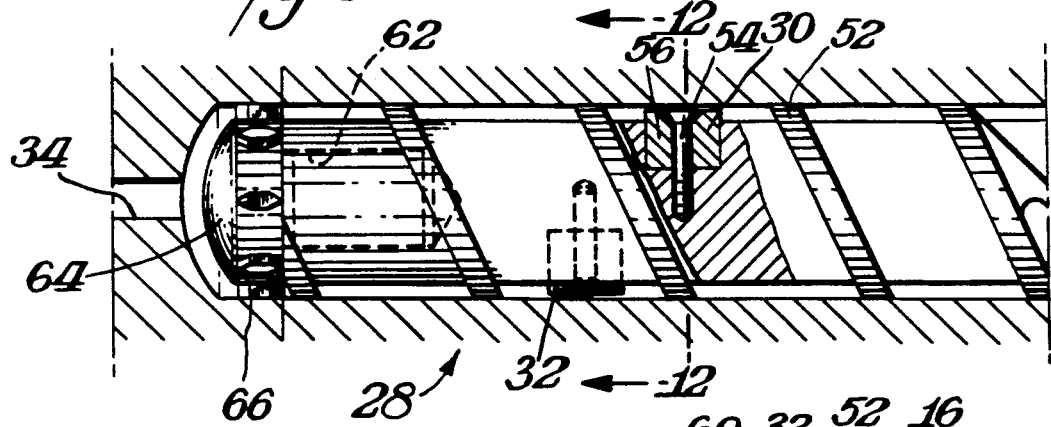
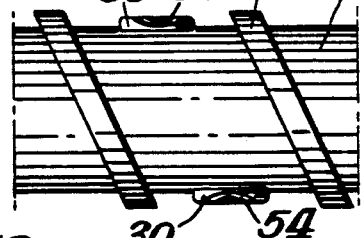
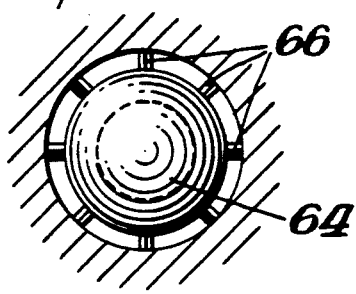
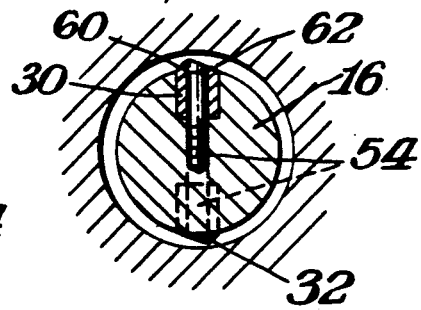
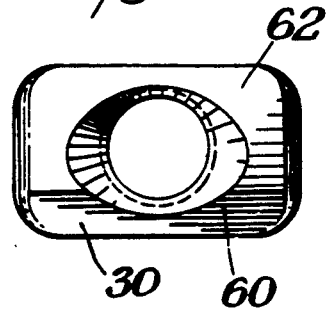

DOUBLE FLIGHTED EXTRUSION SCREW

BACKGROUND OF THE INVENTION

The present invention relates to extrusion screws. Generally in extruders, plastic material in pellet form is fed from a hopper into a barrel or cylinder where the material is progressively heated so that it will melt and can be fed by an extrusion screw into a die to form different types of shapes. The pellets are heated by the barrel and by some frictional heating.

Where attempts have been made to provide the plastic material in powder form, it has been considered necessary to provide vents in the cylinder. The flights on the screw in the vent zone of the cylinder run partially filled and at zero pressure. Vents are provided in the vent zone to permit gases to escape from the melted plastic. These gas pockets escape the melt and travel spirally around the partially filled channel until they can escape out of the vent hole in the cylinder.

It would be advantageous from a cost savings and material usage standpoint to have a cylinder without vents and to have an extruder wherein the plastic material is in powder form.

SUMMARY OF INVENTION

An object of this invention is to provide an extrusion screw capable of using plastic material in powder form.

A further object of this invention is to provide such an extrusion screw with improved mixing characteristics.

A still further object of this invention is to have an extruder wherein the cylinder contains no vents.

In accordance with this invention, an extrusion machine includes a feed hopper for feeding plastic material in powder form to the cylinder containing the extrusion screw. The screw is divided into a number of individual sections. These sections comprise a feed section in communication with the hopper. The next section is a mixing section which then communicates with a transition section communicating with a further mixing section which in turn communicates with a mix and metering section for feeding the material to the die. The cylinder has controlled heating over its length to cause the powder material to melt. In the preferred practice of this invention, the extrusion screw in each of the mixing sections has a double flight so as to cause the material to flow back and forth in each section thus promoting better mixing action which is necessary for using powder particularly in a non-vented cylinder. The mix and meter section is preferably provided with peripheral keys and interrupters on the extrusion screw to also promote better mixing.

The invention may be practiced by forming the double flights in each mixing section in such a manner that one flight has a smaller diameter than the other flight. Additionally, the spacing between the two flights in each set of flights would progressively increase from the feed end to the discharge end of each mixing section. The mix and meter section is preferably provided with two keys which are displaced 180 degrees from each other with one key being downstream from the other key. Each key is preferably formed with one side smoothly extending tangentially from the root surface of the extrusion screw while the opposite side is raised and forms a shoulder with respect to the root surface of the screw. The screw configuration permits any air or gas in the cylinder to flow backwards and be discharged through the feed end thus avoiding the need for vents in the cylinder.

BRIEF DESCRIPTION OF THE DRAWINGS

The drawings illustrate in an accurate relative proportion various details of the cylinder and screw portion of the extrusion machine.

FIG. 1 is an elevation view partly in section of a portion of an extruder machine in accordance with this invention;

FIG. 2 is an enlarged elevation view of the feed section of the cylinder in the extruder of FIG. 1;

FIG. 3 is an enlarged elevation view of the first mixing section in the cylinder of FIG. 1;

FIG. 4 is a cross sectional view taken through FIG. 3 along the line 4—4;

FIG. 5 is a cross sectional view taken through FIG. 6 along the line 5—5;

FIG. 6 is an enlarged elevation view of the transition section and the second mixing section in the cylinder of FIG. 1;

FIG. 7 is a cross sectional view taken through FIG. 6 along the line 7—7;

FIG. 8 is an enlarged elevation partly in section of the mix and meter section of the cylinder shown in FIG. 1;

FIG. 9 is a top plan view of a portion of the mix and meter section shown in FIG. 8;

FIG. 10 is a view similar to FIG. 9 with the screw rotated 90 degrees;

FIG. 11 is a downstream end elevation view of the screw shown in FIG. 1;

FIG. 12 is a cross sectional view taken through FIG. 8 along the line 12—12; and FIG. 13 is a top plan view of one of the keys shown in FIGS. 8—9 and 12.

DETAILED DESCRIPTION

FIG. 1 illustrates an extruder 10 in accordance with this invention. As shown therein, extruder 10 includes a feed hopper 12 and an elongated barrel or cylinder 14 containing an extrusion screw 16 mounted at one end to a gear box 18. In general the screw 16 may be considered as being divided into a number of individual sections. These sections include feed section 20, first mixing section 22, transition section 24, second mixing section 26 and mix and meter section 28 which communicates with the die (not shown).

In the general operation of extruder 10, plastic material is supplied by hopper 12 into feed section 20. A characteristic of the invention is that the material is in powder form rather than being in the conventional pellet form. Hopper 12 may be of any suitable construction having a metering opening for controlling the flow of the plastic material into feed section 20. In general screw 16 feeds the powder material in the discharge direction toward the die from the feed section 20 in the direction as indicated by the arrow and into the first mixing section 22. The screw 16 in feed section 20 is in the form of a single flight so that the material flows only in the discharge direction. In the mixing zone 22, however, screw 16 is provided with a double flight to cause the material to move back and forth as indicated by the arrows and thereby produce an effective mixing of the material. Next the material is fed into the transition section. The material is then fed into second mixing section 26 which is again provided with a double flight on the screw 16 so as to move the material back and forth and enhance the mixing action thereof. The material then is fed into the mix and meter section 28 where there is additional mixing by means of keys 30, 32 and interruptions as later described. The material is then discharged through orifice 34 into the die.

During the travel of the plastic material from its discharge from hopper 12 to its discharge through orifice 34, the material is subjected to various heating stages beginning with the material being at room temperature where the material enters feed section 20 and with the material eventually being heated to, for example, 360°-370° F. by any suitable means such as by the provision of four heating zones as is conventionally known in the art.

FIG. 2 illustrates in greater detail the cylinder 14 and screw 16 in feed section 20. As shown therein, screw 16 includes end splines 36 for coupling into gear box 18 whereby screw 16 may be rotated. FIG. 2 illustrates a feed opening 38 in cylinder 14 at the lower or metering end of hopper 12 communicating with a discharge opening in hopper 12 as is well known in the art. It is through discharge opening 38 that the plastic material flows to enter cylinder 14 and be conveyed by screw 16 through the different zones of the cylinder.

Cylinder 14 is at room temperature in the vicinity of feed opening 38 and accordingly the powder is also at room temperature when it is discharged from the hopper 12 into the cylinder at discharge opening 38. By the time the powder reaches the discharge end of feed section 20, however, the temperature has been elevated and the powder begins to melt. As shown in FIG. 2, one of the characteristics of this invention is that screw 16 includes a single flight 40 spirally formed on the root surface of screw 16. Preferably the flight in section 20 is of constant pitch. If desired, however, as illustrated in FIG. 2, the spacing between adjacent flights 40a, 40a in the central portion of feed section 20 is less than the spacing between other pairs of adjacent flights. The difference in spacing serves to compress the powder where the flights are closer together and permit the powder to then become less dense or non-compressed where the flights are spaced further apart. As also shown in FIG. 2, the diameter of the flights 40 on screw 16 in feed section 20 is substantially equal to the inside diameter of cylinder 14.

FIGS. 3-4 illustrate various details of the first mixing section 22. As shown therein, screw 16 includes a double flight 42, 44 so as to cause the material to reciprocate back and forth as it generally moves toward the discharge end of mixing section 22. Pockets are formed between the flight where the flights begin to separate and are re-joined at each end of section 22. Mixing section 22 includes various structural features which enhance the mixing of the plastic material. As shown, for example, in FIG. 3, the distance A between flights 42, 44 at the feed end of mixing section 22 is less than the distance B between the flights 42, 44 at the discharge end. This difference in distance uniformly increases for each pair of flights along the length of mixing section 22. Similarly, as also shown in FIG. 3, the distance between the thread of the secondary flight 44 and its adjacent downstream primary flight 42 decreases from the upstream end where the distance is greatest to the downstream end where the distance is the least. This progressively narrower channel results from both the primary flight 42 having a constant step or distance between adjacent threads and the secondary flight also having a constant step but the steps differ from each other in that the step of the secondary flight is larger than the step of the primary flight. As also shown in FIG. 3, the diameter of flight 42 is greater than the diameter of flight 44 with flight 42 extending substantially contiguous to the inner surface of cylinder 14.

As also shown in FIG. 3, the distance between the primary flight 42 and its adjacent downstream secondary flight 44 increases toward the discharge end of the mix section 22. At about the longitudinal center of mix section 22, the distance between the secondary flight 44 and its adjacent upstream primary flight 42 is equal to the distance between that secondary flight and its adjacent downstream primary flight. In other words at about the center of the mix section, the secondary flight is midway between its adjacent primary flights. From this midway position, the distance between the secondary flight and its adjacent downstream primary flight decreases to where the flights rejoin at the downstream end of the mix section.

Another structural characteristic of mixing section 22 is that the root diameter of screw 16 also uniformly increases from the feed end to the discharge end of mixing section 22. Thus as shown in FIG. 3, the distance C from the root surface of screw 16 to the inner surface of cylinder 14 is greater than the corresponding distance D at the discharge end of mixing section 22.

The use of the double flights in the mixing chambers promotes a reciprocating or back and forth motion in that the difference in diameter of the flights causes the forward and backward flow which is progressively in the forward or discharge direction. Additionally, the variations in spacing of the flights in the different sections also result in creating alternating conditions wherein the material is compressed and then permitted to become less dense which enhances the mixing action. This configuration of screw 16 permits any air or gas to travel backwards and escape through the feed end such as through hopper 12.

FIGS. 5-6 illustrate the details of transition section 24. As shown therein, screw 16 is provided with a single flight 46 having a diameter substantially equal to the inside diameter of cylinder 14. The root diameter of screw 16 is uniform throughout transition section 24 and is equal to the root diameter at the discharge end of mixing section 22 wherein the root surface of screw 16 would also be spaced from the inner wall of cylinder 14 by distance D. It is similarly noted that the root diameter of screw 16 in the feed section 20 is also uniform with the spacing from the inner wall of cylinder 14 corresponding to the distance C. The progressively heated resin material fed into transition section 24 is moved uniformly through the transition section 24 so as to generally homogenize the condition of the material in preparation for the next mixing action in mixing section 26.

As shown in FIGS. 6-7, second mixing section 26 is of generally similar construction to the first mixing section 22 in that screw 16 includes a double flight 48, 50 wherein flight 48 has an outside diameter generally equal to the inside diameter of cylinder 14 while flight 50 is of lesser diameter. Similarly the spacing between adjacent flights 48, 50 uniformly increases with respect to the next set of adjacent flights from the upstream end to the discharge end of mixing section 26. Additionally pockets are formed where the flights begun to separate and are re-joined at each end of section 26.

One difference between mixing section 26 and mixing noted, the root diameter uniformly increases from the feed end to the discharge end of mixing section 22. In mixing section 26, however, the change in diameter is such that the increase occurs in a step-like fashion between adjacent sets of flights rather than uniformly. Moreover, the change in root diameter is such that the root diameter increases from the feed end to about two-thirds of the way toward the discharge end whereby the spacing E at the upstream end is greater than the spacing F about two-thirds of the way from the upstream end to the discharge end. The spacing then decreases to the distance G at the discharge end of mixing section 26. It is noted that the spacing E corresponds to the spacing D at the discharge end of mixing section 22.

FIGS. 8-13 illustrate the details of the mix and meter section 28 which represents an important part of this invention. As shown in FIG. 8, screw 16 includes a single flight 52 extending along the length of section 28 having a diameter generally equal to the inside diameter of cylinder 14. An important feature of this invention is the inclusion of a pair of keys 30, 32 formed in the root surface of screw 16. Keys 30, 32 are arranged a half flight apart so that in one orientation keys 30, 32 are separated by a flight such as illustrated in FIG. 8, but when screw 16 is rotated 90 degrees from that orientation, the keys are between the same set of flights as illustrated in FIG. 10. Keys 30, 32 may be formed in any suitable manner. In one practice of this invention, each key is a screw 54 mounted in block 56 and screwed into extruder screw 16 to hold the block in place. The head of screw 54 is then swaged and ground as illustrated in FIG. 13. The resultant structure of keys 30, 32 is such that the back face 58 forms a smooth tangential extension of the root surface of extruder screw 16. The front face 60, however, is raised above the outer root surface of extruder screw 16 to form a slanted shoulder as best illustrated in FIG. 12.

The discharge end of screw 16 adjacent orifice 34 is best illustrated in FIGS. 8 and 11. As shown therein, the discharge end is provided with an axial threaded opening 62 for receiving threaded end member 64. End member 64 is spaced from the inner wall of cylinder 14 to create an open area or gap in which a series of equally spaced coarcuate projections or interruptions 66 are provided to interrupt the flow of the material passing from screw 16. As shown in FIG. 8, the outside diameter of each interruption 66 is the same as the outside diameter of flight 52. The material then flows over end member 64 and is discharged through orifice 34 as shown in FIG. 1.

Device 10 may be of any suitable dimensions and made of any suitable materials such as those known in the art. For example, cylinder 14 may have an overall length of 50 inches from its upstream end to its discharge end with screw 16 having a diameter of 2 inches, thus having an L/D of 25. The L/D may also be 28.

The following is a description of the processing of powder material in a screw for a 60 mm diameter extruder particularly designed for processing PVC powder. The same concepts can be used for other diameter extruders.

The melting of the material in the single screw occurs by compression generated by the input root diameter in feed section 20 which is smaller than the output diameter in section 28.

Keeping in mind that the input material is a powder, the melting occurs by heat generated by the screw on the inner part, and on the outer part by the cylinder, where the heating coil is located, and by pressure.

During the rotation of the screw, which has variable pitches, the core compresses the powder and pushes it towards the cylinder and the screw creating a compression which originates the melt. The material which melts most rapidly is the one which comes in contact with the hot parts (screw/cylinder) leaving the inner part of the material cooler.

As can be seen in FIGS. 1-3, the screw capacity has a constant pitch (for about 5 flights) in section 20, after which a second flight in section 22 takes over with a diameter different than the original one.

The purpose of this flight in mix section 22 is to interrupt the constant flow of the advancing powder, and, since the screw is hot, to heat the inner part of the material which up to now had remained cool.

Moreover, since the material encounters an obstacle, the flow is reduced, the double flight in mix section 22 further compresses the material, and since it is lower, besides increasing the compression, it creates a back-flow of the material. In this respect, this second flight in section 22 diametrically smaller than the original one, originates a second variable pitch channel gradually tightening the original channel, and forces its sides to touch all the material around it, creating a back-flow and consequently causing the hot parts to come in contact with the cooler parts. This is the function of the first mixing section 22 where powder is melted and transformed into a solid.

In section 24, the screw goes back to a single flight allowing the material to decompress (thus avoiding great pressure in the center which, given the nature of plastic, would tend to burn) and to present itself as such (i.e., decompressed) in the second mixing section 26, whose function is the same as the one in section 22, i.e., by recutting the material with the 2nd flight creating further compression and the possibility of converting the material in this phase into a solid at a greater inner/outer temperature uniformity.

At the end of the second mixing section 26, the material is decompressed for 1 pitch in section 28 and returns to a normal pitch.

After this the material encounters two protrusions or keys 30,32 on the core of the screw. The first key 30 is at 1½ pitch from the mixing section 26, and the second key 32 is located after another ½ pitch. The keys 30,32 may have a length which is the same as the pitch of the screw and would have their depending on the diameter of the screw. The projection of the keys 30,32 can vary from 1 to 10 mm from the outer wall of the cylinder proportionally to the diameter of the screw. The more the key covers pitch the lower it must be, the more it is reduced, compared to the measure of the pitch, the higher it can be.

The function of each key is to pick up again the material which is denser closer to the core and cylinder at the hotter part while the material is less dense where it is cooler between the core and cylinder. In the protrusion or key area the material is compressed and tears longitudinally creating a higher peripheral velocity near the cylinder and forcing the inner part of the material to rotate on itself.

With this system a greater conformity of the material is created and consequently a more homogeneous melt is achieved.

Afterwards, leaving the key area the material returns to normal for about one and half pitch. Before entering the perforated die, the material is interrupted by a specially designed tip which is placed at the end of the screw to break up the rectangular part of the worm into small parts which are then transformed into rounded ones. This is achieved in the spaces in the tip which, rotating with the screw, creates a centrifuge causing the parts to become rounded.

After this process the material presents itself perfectly amalgamated between outer and inner parts.

Machine 10 represents a number of distinct advantages over the prior art. The screw configuration (1) includes different diameter flights, different spacing of flights and pockets at the ends of the sections, (2) subjects the plastic material to alternate actions of compression and non-compression and (3) separates the mixing sections by a transition section. Such configuration permits the air or gas to work its way backward to the feed end of cylinder 14 where it apparently exits through the hopper 12. Thus the gas may exit without vents in the cylinder 14. The ability to use powder, rather than pellets, results in a cost savings of about 16–17 percent. Moreover, the invention permits the extrusion screw to be mounted into a conventional pellet extruder without any other modification to the extruder and yet use powder as the plastic material.

I claim:

1. An extrusion screw for extruding plastic material in an extruder including a feed hopper having a discharge opening, a heatable cylinder having a feed end and a discharge end, said extrusion screw being mounted for longitudinally rotating in the cylinder, said extrusion screw having a plurality of sections including a feed section at the feed end of said screw, a first mix section adjacent said feed section, a transition section adjacent said first mix section, a second mix section adjacent said transition section, a mix and meter section adjacent from said second mix section for conveying the material to a discharge orifice in the cylinder to a die, said extrusion screw including a single primary flight which extends the length of said screw from said feed end of said feed section to the discharge end of said mix and meter section and through all of said plurality of sections, said primary flight extending around said screw in said transition section a plurality of times, said primary flight having a constant step in each of said first mix section and said second mix section, a secondary flight in each of said first mix section and said second mix section with the thread of said secondary flight being between the thread of said primary flight without any other flight in either of said first mix section and said second mix section, said secondary flight being of a constant step which differs from said constant step of said primary flight, said secondary flight being of lesser diameter than said primary flight, said secondary flight being joined to said primary flight at the upstream end of each of said mix sections, a channel formed by the distance between the thread of said secondary flight and the thread of its adjacent downstream primary flight, said distance decreasing from said upstream end of each of said mix sections where said distance is greatest to the downstream end of each of said mix sections where said distance is the least, and said primary flight being joined to said secondary flight at said discharge end of each of said mix sections to cause the material to reciprocate back and forth as it is conveyed therethrough.

2. The screw of claim 1 wherein keys are radially mounted to said extrusion screw in said mix and meter section.

3. The screw of claim 2 including interrupter projections radially mounted to said extrusion screw at the discharge end of said extrusion screw in said mix and meter section.

4. The screw of claim 3 wherein said extrusion screw has a non-uniform root diameter in said first and second mix sections.

5. The screw of claim 4 wherein the flights of said double flight has a first flight with a diameter substantially equal to the inside diameter of the cylinder and a second flight of lesser diameter than said first flight.

6. The screw of claim 5 wherein said root diameter uniformly increases in the discharge direction of said first mix section.

7. The screw of claim 6 wherein said root diameter increases from the feed end of said second mix section to a location between its feed and discharge ends and then decreases.

8. The screw of claim 7 wherein said increase and decrease of said root diameter in said second mix section is stepwise.

9. The screw of claim 7 wherein said keys comprise two diametrically offset keys located a half flight apart from each other.

10. The screw of claim 9 wherein each of said keys includes a first surface extending tangentially from the root surface of said screw and a second raised surface disposed beyond said root surface.

11. The screw of claim 10 wherein an end member is axially mounted to the discharge end of said screw, said end member having an outer peripheral surface spaced from the inner surface of the cylinder to form an annular gap therebetween, and said interrupter projections being uniformly spaced and coarcuately mounted on said end member in said gap.

12. The screw of claim 11 wherein said screw has a single flight in said feed section, and adjacent portions of said flight at the central portion of said feed section being closer together than other adjacent portions.

13. The screw of claim 12 in combination with a cylinder which is non-vented.

14. The screw of claim 3 wherein said keys comprise two diametrically offset keys located a half flight apart from each other.

15. The screw of claim 14 wherein each of said keys includes a first surface extending tangentially from the root surface of said screw and a second raised surface disposed beyond said root surface.

16. The screw of claim 15 wherein an end member is axially mounted to the discharge end of said screw, said end member having an outer peripheral surface spaced from the inner surface of the cylinder to form an annular gap therebetween, and said interrupter projections being uniformly spaced and coarcuately mounted on said end member in said gap.

17. The screw of claim 1 in combination with a cylinder which is non-vented.

18. The screw of claim 1 in combination with a cylinder, and the configuration of said screw comprising means for conveying gas back through the feed end of said cylinder.

19. The screw of claim 18 wherein said cylinder is non-vented.

20. The screw of claim 1 wherein said step of said secondary flight is greater than said step of said primary flight.

21. The screw of claim 1 wherein said primary flight has a constant step throughout the length of said screw.

22. The screw of claim 1 in combination with a feed hopper having plastic material in powder form therein, said feed hopper being in flow communication with a non-vented cylinder, and said screw being in said cylinder.

* * * * *